US010721756B2

(12) United States Patent
Hosseini et al.

(10) Patent No.: US 10,721,756 B2
(45) Date of Patent: Jul. 21, 2020

(54) REPETITION-BASED UPLINK FOR LOW LATENCY COMMUNICATIONS IN A NEW RADIO WIRELESS COMMUNICATION SYSTEM

(71) Applicant: QUALCOMM Incorporated, San Diego, CA (US)

(72) Inventors: Seyedkianoush Hosseini, San Diego, CA (US); Alberto Rico Alvarino, San Diego, CA (US); Jing Sun, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 15/796,392

(22) Filed: Oct. 27, 2017

(65) Prior Publication Data

US 2018/0234997 A1   Aug. 16, 2018

Related U.S. Application Data

(60) Provisional application No. 62/458,395, filed on Feb. 13, 2017.

(51) Int. Cl.
*H04W 72/12* (2009.01)
*H04L 1/08* (2006.01)
(Continued)

(52) U.S. Cl.
CPC .......... *H04W 72/1268* (2013.01); *H04L 1/08* (2013.01); *H04W 72/0413* (2013.01);
(Continued)

(58) Field of Classification Search
CPC combination set(s) only.
See application file for complete search history.

(56) References Cited

U.S. PATENT DOCUMENTS 8,737,336 B2   5/2014  Loehr et al.
2009/0307554 A1  12/2009  Marinier et al.
(Continued)

FOREIGN PATENT DOCUMENTS

WO   WO-2017/023352 A1   2/2017

OTHER PUBLICATIONS

Huawei et al., "Short TTI for UL Transmissions", 3GPP DRAFT; R1-160294, 3rd Generation Partnership Project (3GPP), Mobile Competence Centre, 650, Route Des Lucioles, F-06921 Sophia-Antipolis Cedex, France, vol. RAN WG1, No. St Julian's, Malta; Feb. 15, 2016-Feb. 19, 2016 Feb. 6, 2016, XP051064112, Retrieved from the Internet: URL:http://www.3gpp.org/ftp/tsg_ran/WG1_RL1/TSGR1_84/Docs/ [retrieved on Feb. 6, 2016], 4 pages.
(Continued)

*Primary Examiner* — Asad M Nawaz
*Assistant Examiner* — Syed Ali
(74) *Attorney, Agent, or Firm* — Dalei Dong; Arent Fox LLP

(57) ABSTRACT

A method and apparatus for enabling repetitive transmissions for low latency systems is disclosed. For example, a base station may determine whether an uplink coverage parameter for a UE communicating with the network entity on an uplink communication channel satisfies an uplink coverage threshold, and transmit an activation message for repetition-based uplink communications to the UE based on a determination that the uplink coverage parameter for the UE communicating with the network entity on the uplink communication channel satisfies the uplink coverage threshold. Further, a UE may receive an activation message for
(Continued)

repetition-based uplink communications from a network entity, and perform repetitive transmissions on the uplink communication channel for the duration indicated by the one or more transmission parameters in the activation message, the repetitive transmissions being configured based on the uplink sTTI pattern.

18 Claims, 6 Drawing Sheets

(51) Int. Cl.
    *H04W 72/04*     (2009.01)
    *H04L 1/00*     (2006.01)
    *H04L 5/00*     (2006.01)
    *H04L 1/18*     (2006.01)
    *H04L 27/26*     (2006.01)

(52) U.S. Cl.
    CPC .......... *H04L 1/0025* (2013.01); *H04L 1/1812* (2013.01); *H04L 5/005* (2013.01); *H04L 5/0007* (2013.01); *H04L 5/0051* (2013.01); *H04L 5/0091* (2013.01); *H04L 27/261* (2013.01)

(56) References Cited

U.S. PATENT DOCUMENTS

| | | |
|---|---|---|
| 2016/0050667 A1 | 2/2016 | Papasakellariou et al. |
| 2016/0295584 A1 | 10/2016 | Chen et al. |
| 2017/0019894 A1 | 1/2017 | Nimbalker et al. |
| 2017/0331670 A1* | 11/2017 | Parkvall ............ H04W 52/0274 |
| 2017/0332386 A1* | 11/2017 | Li ........................ H04L 1/1812 |
| 2018/0167968 A1* | 6/2018 | Liu ...................... H04L 1/1861 |
| 2018/0176945 A1* | 6/2018 | Cao ...................... H04L 1/1864 |
| 2018/0227944 A1* | 8/2018 | Yerramalli ................ H04L 1/08 |
| 2018/0234988 A1* | 8/2018 | Shimezawa ........... H04W 16/14 |
| 2019/0053211 A1* | 2/2019 | Ying ................... H04W 72/044 |
| 2019/0141700 A1* | 5/2019 | Kwak ................. H04L 27/2602 |
| 2019/0222364 A1* | 7/2019 | Shimoda ................. H04L 5/005 |
| 2019/0222390 A1* | 7/2019 | Su ........................ H04L 27/2611 |
| 2019/0379437 A1* | 12/2019 | Park .................... H04L 27/2613 |
| 2020/0045725 A1* | 2/2020 | Mochizuki ........ H04W 72/1289 |

OTHER PUBLICATIONS

International Search Report and Written Opinion—PCT/US2018/015941—ISA/EPO—dated Apr. 19, 2018.

Qualcomm Incorporated: "UL Channel Design for Shortened TTI", 3GPP Draft; R1-164459 UL Channel Design for Shortened TTI, 3rd Generation Partnership Project (3GPP), Mobile Competence Centre, 650, Route Des Lucioles, F-06921 Sophia-Antipolis Cedex, France, vol. RAN WG1, No. Nanjing, China; May 23, 2016-May 27, 2016, May 14, 2016, XP051096435, Retrieved from the Internet: URL:http://www.3gpp.org/ftp/tsg_ran/WG1_RL1/TSGR1_85/Docs/ [retrieved on May 14, 2016], 8 pages.

* cited by examiner

REPETITION-BASED UPLINK FOR LOW LATENCY COMMUNICATIONS IN A NEW RADIO WIRELESS COMMUNICATION SYSTEM

CLAIM OF PRIORITY UNDER 35 U.S.C. § 119

The present Application for Patent claims priority to U.S. Provisional Application No. 62/458,395 entitled "REPETITION-BASED UPLINK FOR LOW LATENCY COMMUNICATIONS IN A NEW RADIO WIRELESS COMMUNICATION SYSTEM" filed Feb. 13, 2017, which is assigned to the assignee hereof and hereby expressly incorporated by reference herein.

BACKGROUND

Aspects of the present disclosure relate generally to wireless communication networks, and more particularly, to enable repetitive transmissions on an uplink communication channel in a new radio wireless communication system.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, enabling low latency communications even during instances of insufficient uplink coverage is necessary. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method includes enabling repetitive transmissions on an uplink communication channel for wireless communications. The described aspects include receiving, by a user equipment (UE), an activation message for repetition-based uplink communications from a network entity, the activation message including one or more transmission parameters indicating at least a duration for transmissions on an uplink communication channel and an uplink shortened Transmission Time Interval (sTTI) pattern for the transmissions on the uplink communication channel. The described aspects further include performing, by the UE, repetitive transmissions on the uplink communication channel for the duration indicated by the one or more parameters in the activation message (and/or a configuration message), the repetitive transmissions being configured based on the uplink sTTI pattern.

In an aspect, an apparatus for enabling repetitive transmissions on an uplink communication channel for wireless communications may include a transceiver, a memory; and at least one processor coupled to the memory and configured to receive, by a UE, an activation message for repetition-based uplink communications from a network entity, the activation message including one or more transmission parameters indicating at least a duration for transmissions on an uplink communication channel and an uplink sTTI pattern for the transmissions on the uplink communication channel. The described aspects further perform, by the UE, repetitive transmissions on the uplink communication channel for the duration indicated by the one or more parameters in the activation message (and/or a configuration message), the repetitive transmissions being configured based on the uplink sTTI pattern.

In an aspect, a computer-readable medium may store computer executable code for enabling repetitive transmissions on an uplink communication channel for wireless communications is described. The described aspects include code for receiving, by a UE, an activation message for repetition-based uplink communications from a network entity, the activation message including one or more transmission parameters indicating at least a duration for transmissions on an uplink communication channel and an uplink sTTI pattern for the transmissions on the uplink communication channel. The described aspects further include code for performing, by the UE, repetitive transmissions on the uplink communication channel for the duration indicated by the one or more parameters in the activation message (and/or a configuration message), the repetitive transmissions being configured based on the uplink sTTI pattern.

In an aspect, an apparatus for enabling repetitive transmissions on an uplink communication channel for wireless communications is described. The described aspects include means for receiving, by a UE, an activation message for repetition-based uplink communications from a network entity, the activation message including one or more transmission parameters indicating at least a duration for transmissions on an uplink communication channel and an uplink sTTI pattern for the transmissions on the uplink communication channel. The described aspects further include means for performing, by the UE, repetitive transmissions on the uplink communication channel for the duration indicated by the one or more parameters in the activation message (and/or a configuration message), the repetitive transmissions being configured based on the uplink sTTI pattern.

In accordance with another aspect, a method includes enabling repetitive transmissions on an uplink communication channel for wireless communications. The described aspects include determining, by a network entity, whether an uplink coverage parameter for a UE communicating with the network entity on an uplink communication channel satisfies an uplink coverage threshold. The described aspects further include transmitting, by the network entity, an activation message (and/or a configuration message) for repetition-based uplink communications to the UE based on a determination that the uplink coverage parameter for the UE communicating with the network entity on the uplink communication channel satisfies the uplink coverage threshold, the activation message including one or more transmission parameters indicating at least a duration for transmissions on the uplink communication channel and an uplink sTTI pattern for the transmissions on the uplink communication channel.

In an aspect, an apparatus for enabling repetitive transmissions on an uplink communication channel for wireless communications may include a transceiver, a memory; and at least one processor coupled to the memory and configured to determine, by a network entity, whether an uplink coverage parameter for a UE communicating with the network entity on an uplink communication channel satisfies an uplink coverage threshold. The described aspects further transmit, by the network entity, an activation message (and/or a configuration message) for repetition-based uplink communications to the UE based on a determination that the uplink coverage parameter for the UE communicating with the network entity on the uplink communication channel satisfies the uplink coverage threshold, the activation message including one or more transmission parameters indicating at least a duration for transmissions on the uplink communication channel and an uplink sTTI pattern for the transmissions on the uplink communication channel.

In an aspect, a computer-readable medium may store computer executable code for enabling repetitive transmissions on an uplink communication channel for wireless communications is described. The described aspects include code for determining, by a network entity, whether an uplink coverage parameter for a UE communicating with the network entity on an uplink communication channel satisfies an uplink coverage threshold. The described aspects further include code for transmitting, by the network entity, an activation message (and/or a configuration message) for repetition-based uplink communications to the UE based on a determination that the uplink coverage parameter for the UE communicating with the network entity on the uplink communication channel satisfies the uplink coverage threshold, the activation message including one or more transmission parameters indicating at least a duration for transmissions on the uplink communication channel and an uplink sTTI pattern for the transmissions on the uplink communication channel.

In an aspect, an apparatus for enabling repetitive transmissions on an uplink communication channel for wireless communications is described. The described aspects include means for determining, by a network entity, whether an uplink coverage parameter for a UE communicating with the network entity on an uplink communication channel satisfies an uplink coverage threshold. The described aspects further include means for transmitting, by the network entity, an activation message (and/or a configuration message) for repetition-based uplink communications to the UE based on a determination that the uplink coverage parameter for the UE communicating with the network entity on the uplink communication channel satisfies the uplink coverage threshold, the activation message including one or more transmission parameters indicating at least a duration for transmissions on the uplink communication channel and an uplink sTTI pattern for the transmissions on the uplink communication channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
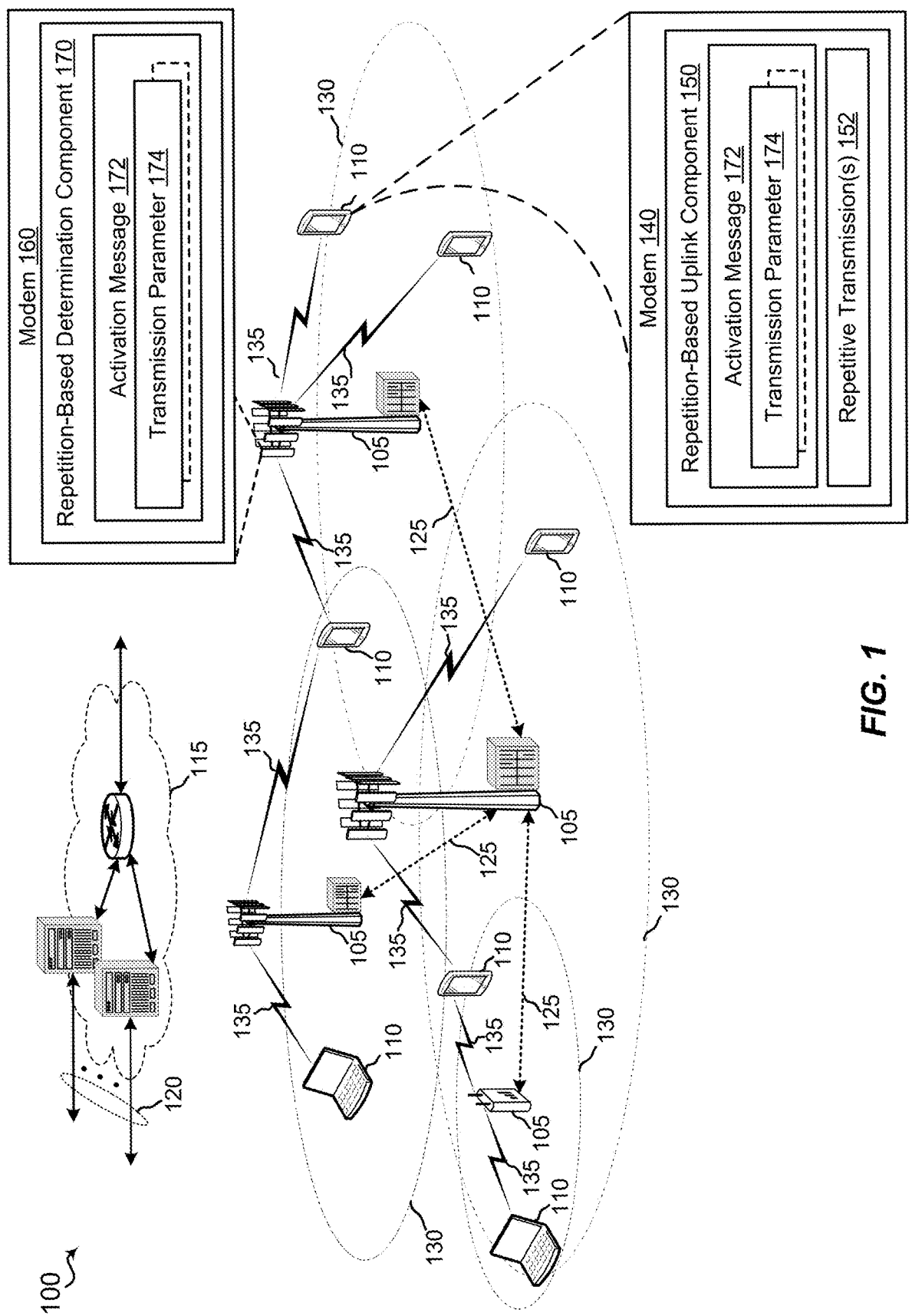
FIG. 1 is a schematic diagram of an example of a wireless communication network including at least one base station having a repetition-based uplink component configured to transmit an activation message to enable repetitive transmissions on an uplink communication channel and at least one user equipment (UE) having a repetition-based uplink component configured to receive the activation message and perform repetitive transmissions on the uplink communication channel.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to communicating in a wireless network according to an uplink frame structure of a lower latency wireless communication technology that is based on a shortened transmission time interval (sTTI) having a duration less than that of a legacy wireless communication technology. For example, in low latency LTE systems, such as URLLC systems, downlink and uplink sTTI lengths are configured as 2 symbols or 1 slot. Further, under 2 symbol sTTI configurations, the uplink coverage between a UE and the network may be insufficient for a successful reception of control information or data information.

To accommodate for insufficient coverage for the successful reception of information, the UE may be configured to use a longer uplink TTI as compared to a downlink TTI. For example, in such systems, when a 2 symbol sTTI is used for downlink communications, the UE may use a 1 slot sTTI for uplink communications. In another example, when a 2 symbol sTTI is used for downlink communications, the UE may use a 1-ms TTI for uplink communications.

However, in some aspects, the network may not reconfigure the TTI for uplink communications when detecting uplink coverage issues. Further, for instance, the network may want to maintain the downlink and uplink sTTI lengths as 2 symbols and/or 1 slot for low latency system. As such, to efficiently utilize the uplink sTTI lengths for uplink communications, the network may enable repetition-based uplink communications with a UE in a new radio environment.

Specifically, in an aspect, the present aspects may enable using multiple consecutive 2 symbol sTTIs to transmit information on the uplink communication channel. For example, the network may determine, whether an uplink coverage parameter for a UE communicating with the network entity on an uplink communication channel satisfies an uplink coverage threshold. Further, the present aspects may include transmitting, by the network entity, an activation message (and/or a configuration message) for repetition-based uplink communications to the UE based on a determination that the uplink coverage parameter for the UE communicating with the network entity on the uplink communication channel satisfies the uplink coverage threshold.

Moreover, the present aspects include receiving, by a UE, an activation message for repetition-based uplink communications from a network entity, the activation message including one or more transmission parameters. Additionally, the present aspects include performing, by the UE, repetitive transmissions on the uplink communication channel for the duration indicated by the one or more parameters in the activation message, the repetitive transmissions being configured based on the uplink sTTI pattern.

Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a repetition-based uplink component 150 that performs repetition-based uplink communications with a network entity. Further, wireless communication network 100 includes at least one base station 105 with a modem 160 having a repetition-based determination component 170 that enables repetitive transmissions 152 on an uplink communication channel (e.g., communications link 135). Thus, according to the present disclosure, the base station 105 may transmit an activation message 172 to UE 110 to enable repetitive transmissions 152 in order to overcome insufficient uplink coverage issues. For example, repetitive transmissions 152 may correspond to transmitting one packet multiple times (e.g., when the UE 110 is in a poor coverage area). In another example, repetitive transmissions 152 may correspond to transmitting multiple packets in multiple sTTIs.

In an aspect, repetition-based determination component 170 may be configured to transmit a configuration message indicating a capability for the repetition-based uplink communications with the UE 110. For example, the configuration message may include one or more configuration parameters indicating at least the duration for transmissions on the uplink communication channel (e.g., communications link 135) and the uplink sTTI pattern for the transmissions on the uplink communication channel. The duration for transmissions may correspond to a number of sTTIs to use when repetitive transmissions is enabled. In an example, the configuration message is included within either a Radio Resource Control (RRC) message or a Medium Access Control (MAC) Control Element (CE).

In an aspect, repetition-based uplink component 150 may be configured to receive the configuration message indicating the capability for the repetition-based uplink communications with base station 105.

In an aspect, repetition-based determination component 170 may be configured to determine an uplink coverage parameter for a UE 110 communicating with a base station 105 on an uplink communication channel that satisfies an uplink coverage threshold. For example, during the course of communications between the UE 110 and the base station 105, the base station 105 may continuously monitor the uplink coverage of the UE 110 in order to determine whether to activate/enable repetitive transmissions on an uplink communication channel of the communications link 135.

In an aspect, the repetition-based determination component 170 may be configured to maintain a current network communications configuration with the UE 110 based on a determination that the uplink coverage parameter for the UE 110 communicating with the base station 105 on the uplink communication channel fails to satisfy the uplink coverage threshold.

In an aspect, the repetition-based determination component 170 may be configured to transmit an activation message 172 for repetition-based uplink communications to the UE 110 based on a determination that the uplink coverage parameter for the UE communicating with the base station 105 on the uplink communication channel satisfies the uplink coverage threshold. For example, similar to the configuration message, the activation message 172 may include one or more transmission parameters 174 indicating at least a duration for transmissions on the uplink communication channel and an uplink sTTI pattern for the transmissions on the uplink communication channel. An uplink sTTI pattern (or layout) may include a number of different uplink sTTI patterns to enable 2 symbol uplink sTTI operations, such as, but not limited 150 to, uplink sTTI patterns [3, 2, 2, 2, 2, 3] and/or [2, 2, 3, 2, 2, 3]. In these examples, the brackets correspond to a subframe with 2 slots (e.g., for [3, 2, 2, 2, 2, 3], symbols 3, 2, 2 are located in a first slot while symbols 2, 2, 3 are located in a second slot of the subframe). In an example, the layout is known to the UE 110 as agreed upon during Radio Access Network 1 (RAN1). Further, if the uplink communication channel is IFDMA based, then the number of combinations for the uplink sTTI patterns and the combination of the uplink sTTI pattern assigned to the UE 110 may also be indicated.

In an aspect, the activation message 172 may be transmitted in a variety of ways, For example, the activation message is included within either a Medium Access Control (MAC) Control Element (CE) or a Downlink Control Information (DCI) message. In some examples, the activation message 172 is included within a grant message, and the activation message 172 includes an indication for a number of repetitive transmissions to perform. The grant may correspond to a grant for a shortened Physical Uplink Shared Channel (sPUSCH).

In an aspect, repetition-based uplink component 150 may be configured to receive the activation message 172 for repetition-based uplink communications from the base station 105. In a further aspect, the repetition-based uplink component 150 may be configured to perform repetitive transmissions 152 on the uplink communication channel for the duration indicated by the one or more transmission parameters 174 in the activation message 172. For example, the repetitive transmissions 152 are configured based on the uplink sTTI pattern.

In an aspect, based on the timing of the activation message 172 and the one or more transmission parameters 174 (e.g., the duration for the transmissions on the uplink communication channel), the repetition-based uplink component 150 may be configured to perform the repetitive transmissions 152 for uplink sTTIs across a subframe boundary (e.g., between two or more subframes), such as, performing the repetitive transmissions 152 on a plurality of uplink sTTIs located in two or more subframes. In this example, a coherent uplink channel estimation may not be possible due to a number of factors. For instance, Transmit Power Control (TPC) may change between the subframe boundary. As such, a Sounding Reference Signal (SRS) may need to be sent over the last symbol of a subframe. As a result, phase continuity issues occur across different Demodulation Reference Signals (DMRS) and/or data symbols in two different subframes.

In order to compensate for phase continuity issues that may arise, the repetition-based uplink component 150 may be configured to perform the repetitive transmissions 152 in a plurality of ways. For example, the repetition-based uplink component 150 may be configured to perform the repetitive transmissions 152 only within a subframe. In this example, the start and end points of the uplink transmission occur within the subframe.

In another example, the repetition-based uplink component 150 may be configured to maintain a phase continuity parameter across the one or more subframes for the duration indicated by the one or more transmission parameters 174 in the activation message 172. In this example, the UE 110 and the base station 105 may be configured so as to ensure that TPC will not change across the subframe boundary and that SRS will not be sent. In some instances, if TPC is received or if SRS is requested, both should be deferred until after performing the repetitive transmissions 152. As a result, the base station 105 will be able to coherently combine the received repetitive transmission 152 from all subframes as long as TPC remains the same across the sTTIs within one subframe.

In another example, repetition-based uplink component 150 may be configured to transmit DMRS within each of the two or more subframes for the duration indicated by the one or more transmission parameters 174 in the activation message 172. In this example, channel estimation may occur separately for the sTTIs within different subframes, and as such, the repetition-based uplink component 150 transmit the DMRS within each subframe.

In an aspect, repetition-based uplink component 150 may be configured to determine the transmission scheme for coherent/non-coherent communications on a case-by-case basis. For example, the repetition-based uplink component 150 may determine whether the repetitive transmission 152 spans multiple subframes and whether the UE 110 is required to transmit other physical channel/signals (e.g., SRS) during the repetitive transmissions 152. If so, the repetition-based uplink component 150 assumes non-coherent reception, and as such, the UE 110 may not be required to maintain phase continuity across subframes. Repetition-based uplink component 150 may transmit DMRS within each of the two or more subframes for the duration indicated by the one or more transmission parameters 174 in the activation message 172, as noted above.

In an aspect, due to the use of multiple sTTIs for the duration of performing repetitive transmissions 152, the uplink sTTI pattern is configured for the duration of the repetitive transmissions 152. For example, if the duration corresponds to three sTTIs, and the repetitive transmissions 152 occur across subframes, then the last two sTTIs of a first subframe and the first sTTI of a second subframe are configured. For example, the first sTTI is [R,D], the second sTTI is [R,D,D] and the last sTTI is [D,D] if coherent reception is assumed, where R corresponds to a reserved symbol (e.g., DMRS), and D corresponds to data information. Therefore, the indicated uplink sTTI pattern is [R,D,R,D,D,D,D]. If non-coherent reception is configured, then the uplink sTTI pattern may be [R,D,R,D,X,R,D], where X is used for SRS transmissions. The last sTTI may have a DMRS symbol to enable channel estimation. However, as noted above, multiple uplink sTTI patterns may be defined and indicated to the UE 110 from the base station 105. In some aspects, fixed uplink sTTI patterns may be defined for each starting sTTI and duration sets. As such, the UE 110 will implicitly know which uplink sTTI patterns should be used.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
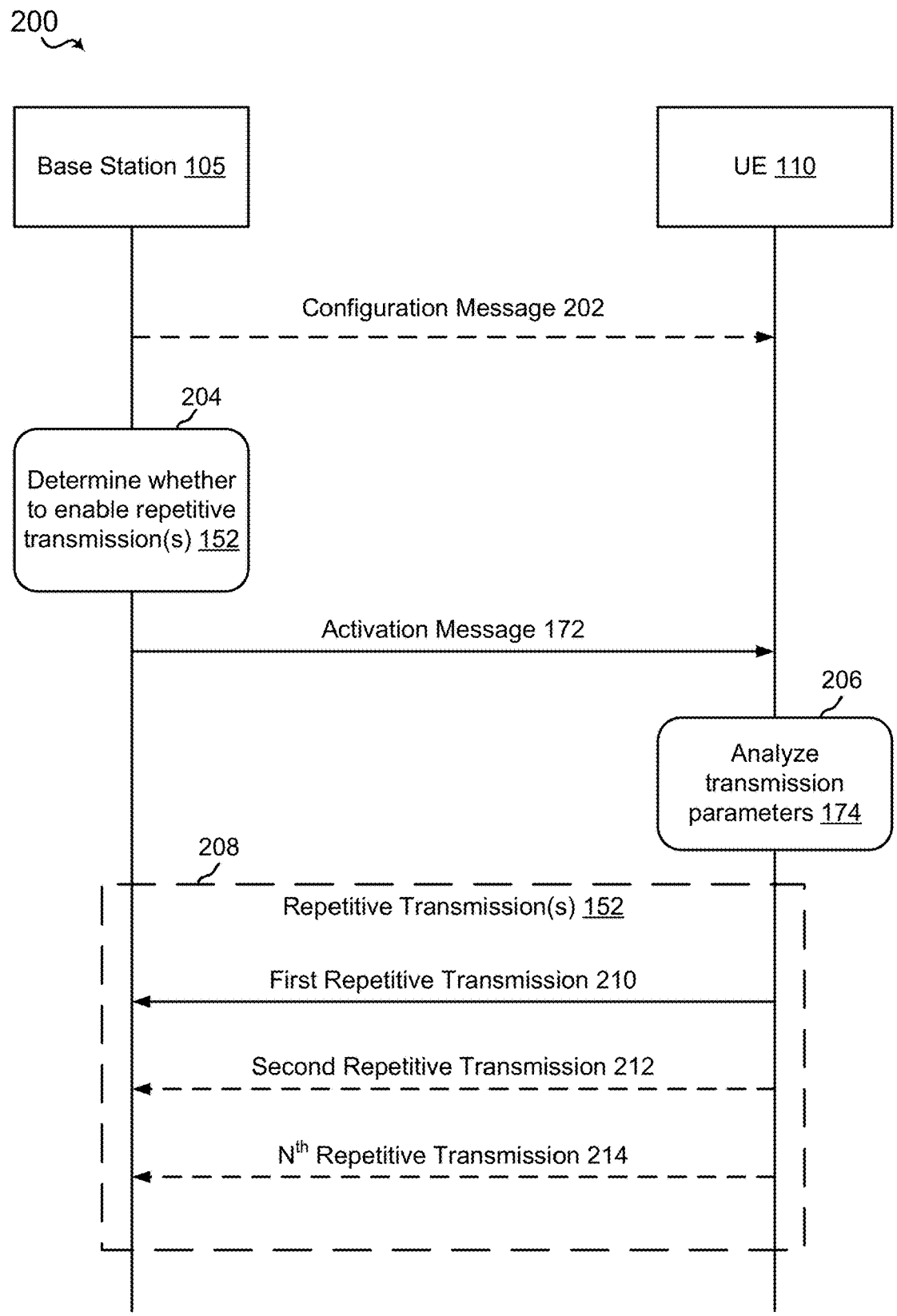
FIG. 2 is a flow diagram of an example wireless communications procedure between a UE and a base station.

FIG. 2 depicts a flow diagram of an example wireless communications procedure 200 between a UE and a base station. For example, the UE and the base station may correspond to the UE 110 and the base station 105, respectively, located in wireless communication network 100 as shown in FIG. 1. The UE 110 may include a modem 140 having a repetition-based uplink component 150 that performs repetition-based uplink communications with a network entity. Further, the base station 105 may include a modem 160 having a repetition-based determination component 170 that enables repetitive transmissions 152 on an uplink communication channel (e.g., communications link 135).

In an aspect, the base station 105 and/or repetition-based determination component 170 may transmit optionally a configuration message 202 indicating a capability for the repetition-based uplink communications to the UE 110. For example, the configuration message 202 may include one or more configuration parameters indicating at least the duration for transmissions on the uplink communication channel and the uplink sTTI pattern for the transmissions on the uplink communication channel 135. In an example, resources used for uplink transmissions (e.g., frequency domain Radio Bearers (RBs) used for each transmission) may include an Redundancy Version (RV) index used for each transmission. Additionally, the Modulation Coding Scheme (MCS) is determined by the RV index for each transmission.

In an aspect, at 204, the base station 105 and/or repetition-based determination component 170 may determine whether to enable repetitive transmission(s) 152. For example, upon transmission of the configuration message 202, the base station 105 may execute the repetition-based determination component 170 to determine whether an uplink coverage parameter for the UE 110 communicating with the network entity (e.g., base station 105) on an uplink communication channel (e.g., communications link 135) satisfies an uplink coverage threshold.

In an aspect, the base station 105 and/or repetition-based determination component 170 may transmit an activation message 172 for the repetition-based uplink communications to the UE 110 based on a determination that the uplink coverage parameter for the UE 110 communicating with the network entity (e.g., base station 105) on the uplink communication channel (e.g., communications link 135) satisfies the uplink coverage threshold. For example, the activation message 172 may include one or more transmission parameters 174 indicating at least a duration for transmissions on the uplink communication channel and an uplink sTTI pattern for the transmissions on the uplink communication channel.

In an aspect, at 206, the UE 110 and/or repetition-based uplink component 150 may analyze the transmission parameters 174 prior to performing the repetitive transmission(s) 152. For example, the UE 110 may execute repetition-based uplink component 150 to identify the duration for transmissions on the uplink communication channel and the uplink sTTI pattern for the transmissions on the uplink communication channel. As such, the UE 110 and/or repetition-based uplink component 150 may adjust/configure the repetitive transmission(s) 152 based these one or more transmission parameter(s) 174.

In an aspect, at 208, the UE 110 and/or repetition-based uplink component 150 may perform repetitive transmissions 152 on the uplink communication channel for the duration indicated by the one or more transmission parameters 174 in the activation message 172. For example, the repetitive transmissions 152 may include a first repetitive transmission 210, a second repetitive transmission 212, and $N^{th}$ repetitive transmission 214, wherein N corresponds to an integer greater than 2, and are configured based on the uplink sTTI pattern. As such, the repetitive transmissions 152 enable the efficient utilization of the uplink sTTI lengths for uplink communications.

Figure 3:
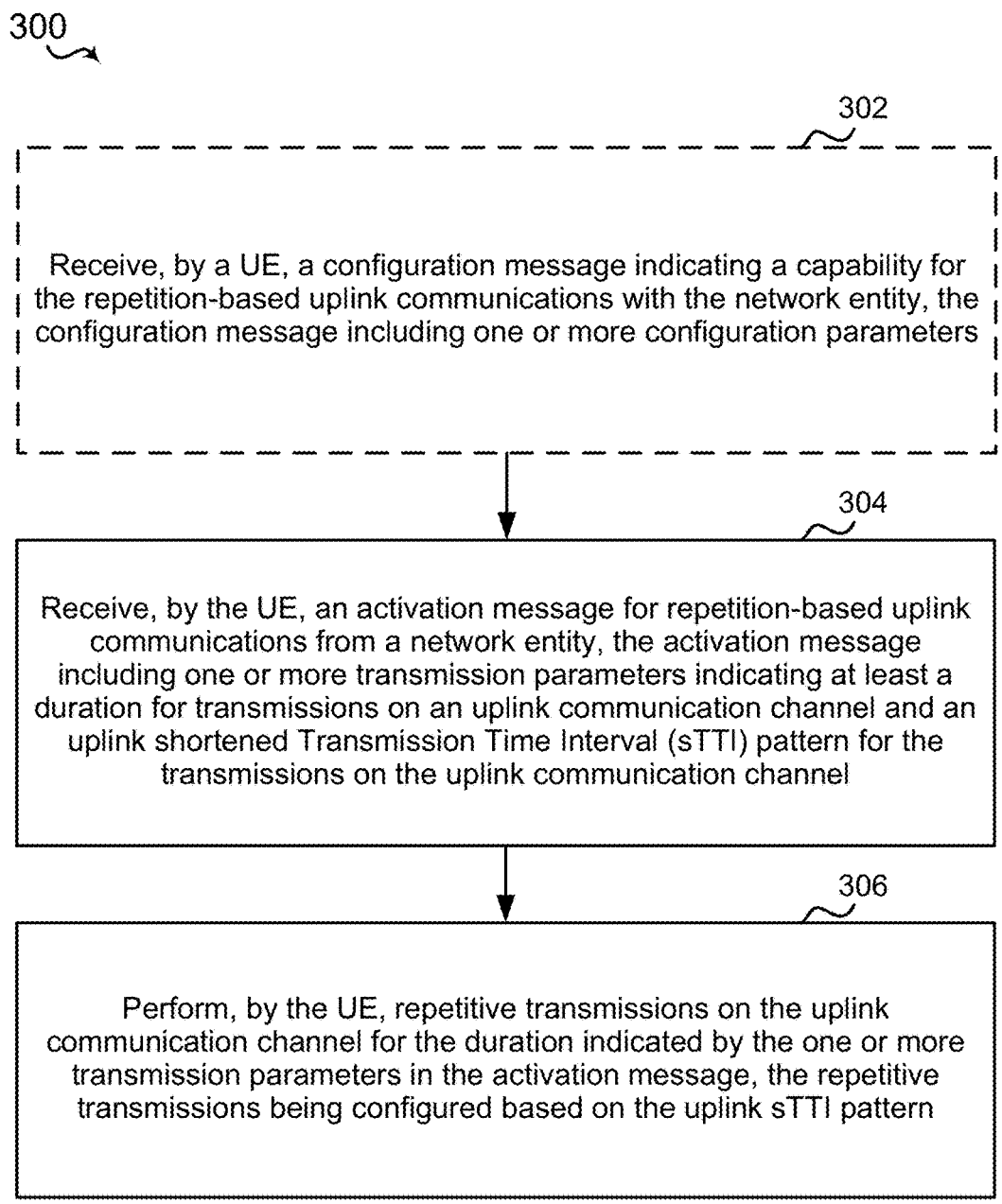
FIG. 3 is a flow diagram of an example of a method of wireless communication at a UE.

Referring to FIG. 3, for example, a method 300 of wireless communication in operating UE 110 according to the above-described aspects to perform repetition-based uplink communications with a network entity includes one or more of the herein-defined actions. The blocks illustrated as having dashed lines may be optional.

At block 302, the method 300 may receive, by the UE, a configuration message indicating a capability for the repetition-based uplink communications with the network entity, the configuration message including one or more configuration parameters. For example, the UE 110 and/or repetition-based uplink component 150 may execute a transceiver 502 (FIG. 5) to receive a configuration message indicating a capability for the repetition-based uplink communications with the network entity (e.g., base station 105), the configuration message including one or more configuration parameters.

At block 304, the method 300 may receive, by the UE, an activation message for repetition-based uplink communications from a network entity, the activation message including one or more transmission parameters indicating at least a duration for transmissions on an uplink communication channel and an uplink shortened Transmission Time Interval (sTTI) pattern for the transmissions on the uplink communication channel. For example, the UE 110 and/or repetition-based uplink component 150 may execute the transceiver 502 (FIG. 5) to receive an activation message 172 for repetition-based uplink communications from a network entity (e.g., base station 105), the activation message 172 including one or more transmission parameters 174 indicating at least a duration for transmissions on an uplink communication channel (e.g., communications link 135) and an uplink sTTI pattern for the transmissions on the uplink communication channel.

At block 306, the method 300 may perform, by the UE, repetitive transmissions on the uplink communication channel for the duration indicated by the one or more parameters in the activation message, the repetitive transmissions being configured based on the uplink sTTI pattern. For example, the UE 110 and/or repetition-based uplink component 150 may execute the transceiver 502 to perform repetitive transmissions 152 on the uplink communication channel (e.g., communications link 135) for the duration indicated by the one or more parameters 174 in the activation message 172, the repetitive transmissions 152 being configured based on the uplink sTTI pattern.

Figure 4:
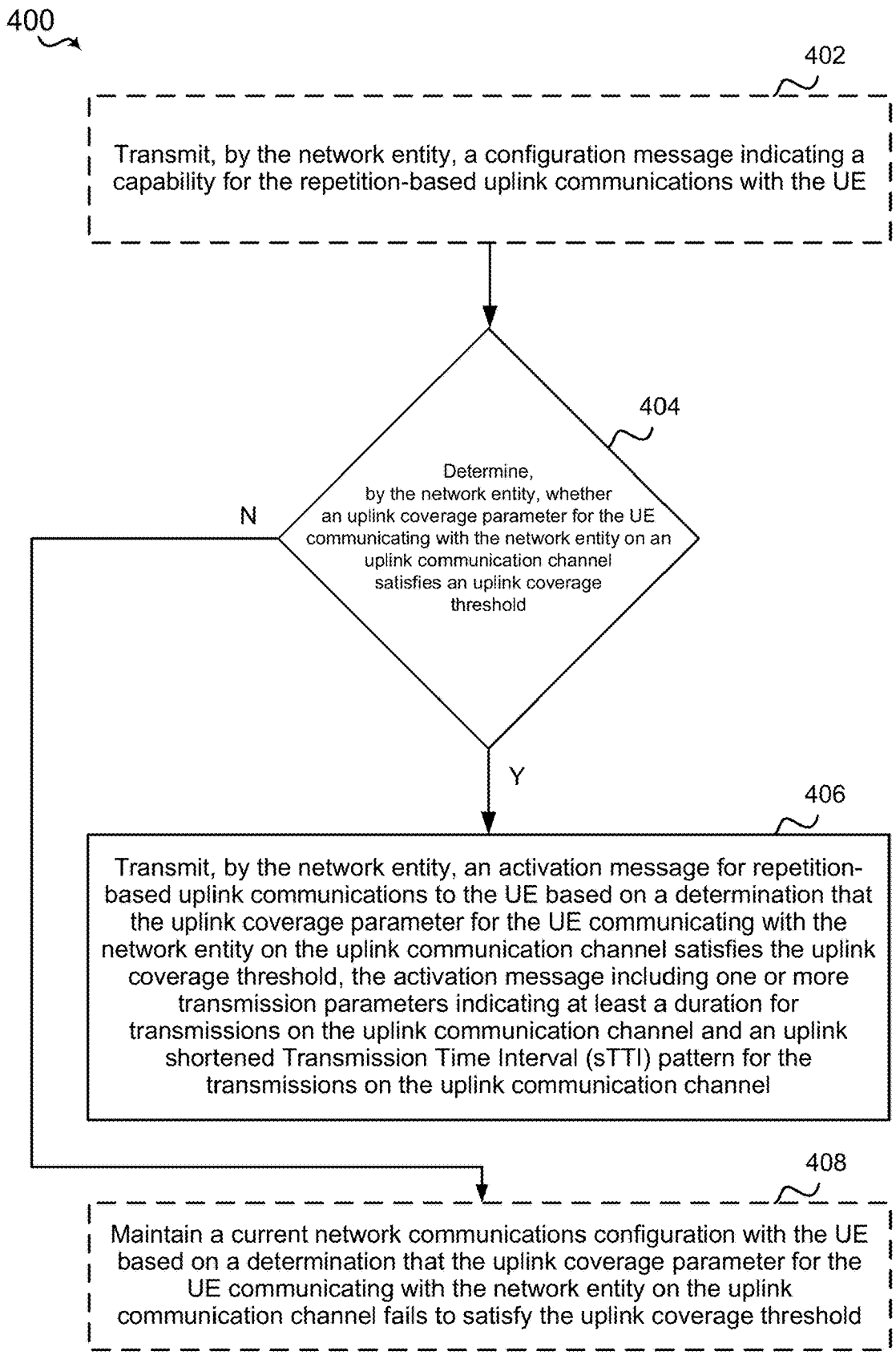
FIG. 4 is a flow diagram of an example of a method of wireless communication at a network entity.

Referring to FIG. 4, for example, a method 400 of wireless communication in operating a network entity such as base station 105 (e.g., gNodeB) according to the above-described aspects to enable repetition-based uplink communications with a UE in a new radio environment includes one or more of the herein-defined actions. The blocks illustrated as having dashed lines may be optional.

At block 402, the method 400 may transmit, by the network entity, a configuration message indicating a capability for the repetition-based uplink communications with the UE, the configuration message including one or more configuration parameters. For example, in an aspect, the base station 105 and/or repetition-based determination component 170 to execute transceiver 602 (FIG. 6) to transmit a configuration message indicating a capability for the repetition-based uplink communications with the UE 110, the configuration message including one or more configuration parameters.

At block 404, the method 400 may determine, by a network entity, whether an uplink coverage parameter for a UE communicating with the network entity on an uplink communication channel satisfies an uplink coverage threshold. For example, in an aspect, the base station 105 may execute the repetition-based determination component 170 to determine whether an uplink coverage parameter for a UE 110 communicating with the network entity (e.g., base station 105) on an uplink communication channel (e.g., communications link 135) satisfies an uplink coverage threshold.

At block 406, the method 400 may transmit, by the network entity, an activation message for repetition-based uplink communications to the UE based on a determination that the uplink coverage parameter for the UE communicating with the network entity on the uplink communication channel satisfies the uplink coverage threshold, the activation message including one or more transmission parameters indicating at least a duration for transmissions on the uplink communication channel and an uplink shortened Transmission Time Interval (sTTI) pattern for the transmissions on the uplink communication channel. For example, in an aspect, the base station 105 and/or repetition-based determination component 170 may execute a transceiver 602 (FIG. 6) to transmit an activation message 172 for the repetition-based uplink communications to the UE 110 based on a determination that the uplink coverage parameter for the UE 110 communicating with the network entity (e.g., base station 105) on the uplink communication channel (e.g., communications link 135) satisfies the uplink coverage threshold, the activation message 172 including one or more transmission parameters 174 indicating at least a duration for transmissions on the uplink communication channel and an uplink sTTI pattern for the transmissions on the uplink communication channel.

At block 408, the method 400 may maintain a current network communications configuration with the UE based on a determination that the uplink coverage parameter for the UE communicating with the network entity on the uplink communication channel fails to satisfy the uplink coverage threshold. For example, in an aspect, the base station 105 and/or repetition-based determination component 170 may execute the transceiver 602 (FIG. 6) to maintain a current network communications configuration with the UE 110 based on a determination that the uplink coverage parameter for the UE 110 communicating with the network entity (e.g., base station 105) on the uplink communication channel (e.g., communications link 135) fails to satisfy the uplink coverage threshold.

Figure 5:
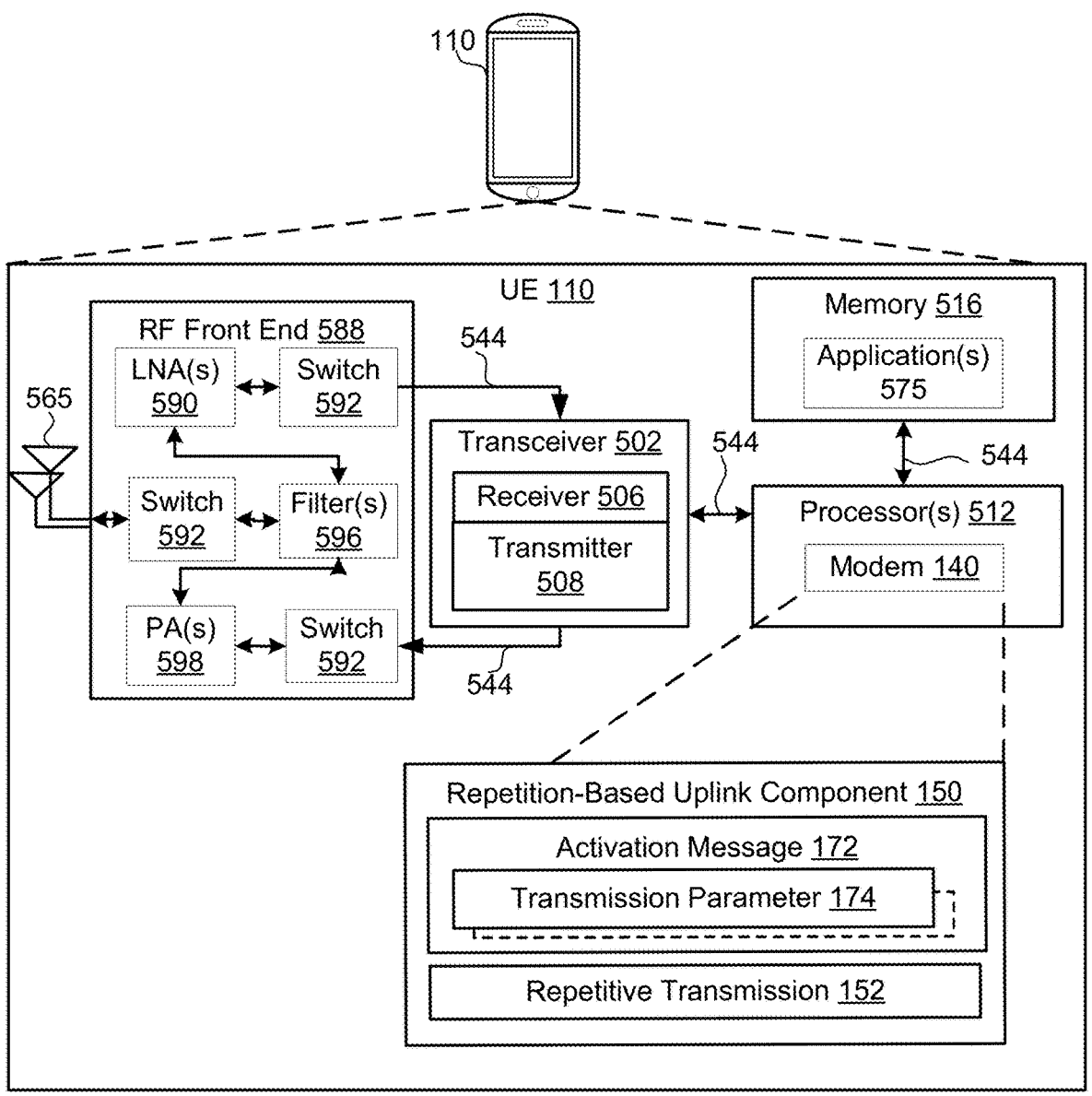
FIG. 5 is a schematic diagram of example components of the UE of FIG. 1.

Referring to FIG. 5, one example of an implementation of an UE 110 may include a variety of components, some of which have already been described above, but including components such as one or more processors 512 and memory 516 and transceiver 502 in communication via one or more buses 544, which may operate in conjunction with modem 140 and repetition-based uplink component 150 to enable one or more of the functions described herein related to performing repetition-based uplink communications with a network entity. Further, the one or more processors 512, modem 514, memory 516, transceiver 502, radio frequency (RF) front end 588 and one or more antennas 565, may be configured to support voice and/or data calls (simultaneously or non-simultaneously) in one or more radio access technologies. In some aspects, the modem 140 may be the same as or similar to the modem 140 (FIG. 1).

In an aspect, the one or more processors 512 can include a modem 140 that uses one or more modem processors. The various functions related to repetition-based uplink component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with the transceiver 502. In other aspects, some of the features of the one or more processors 512 and/or modem 140 associated with repetition-based uplink component 150 may be performed by transceiver 502.

Also, memory 516 may be configured to store data used herein and/or local versions of applications 575 or repetition-based uplink component 150 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining repetition-based uplink component 150 and/or one or more of its subcomponents, and/or data associated therewith, when UE 110 is operating at least one processor 512 to execute repetition-based uplink component 150 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a RF receiver. In an aspect, the receiver 506 may receive signals transmitted by at least one base station 105. Additionally, the receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may include, but is not limited to, an RF transmitter.

Moreover, in an aspect, the UE 110 may include an RF front end 588, which may operate in communication with one or more antennas 565 and transceiver 502 for receiving and transmitting radio transmissions, for example, wireless communications transmitted by at least one base station 105 or wireless transmissions transmitted by the UE 110. The RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, the LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and a corresponding specified gain value based on a desired gain value for a particular application.

Also, for example, one or more filters 596 can be used by the RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, the RF front end 588 can use one or more switches 592 to select a transmit or receive path using a specified filter 596, LNA 590, and/or PA 598, based on a configuration as specified by transceiver 502 and/or processor 512.

As such, the transceiver 502 may be configured to transmit and receive wireless signals through one or more antennas 565 via RF front end 588. In an aspect, the transceiver 502 may be tuned to operate at specified frequencies such that the UE 110 can communicate with, for example, one or more base stations 105 or one or more cells associated with one or more base stations 105. In an aspect, for example, the modem 140 can configure the transceiver 502 to operate at a specified frequency and power level based on the UE configuration of the UE 110 and the communication protocol used by the modem 140.

In an aspect, modem 140 can be a multiband-multimode modem, which can process digital data and communicate with the transceiver 502 such that the digital data is sent and received using the transceiver 502. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 6:
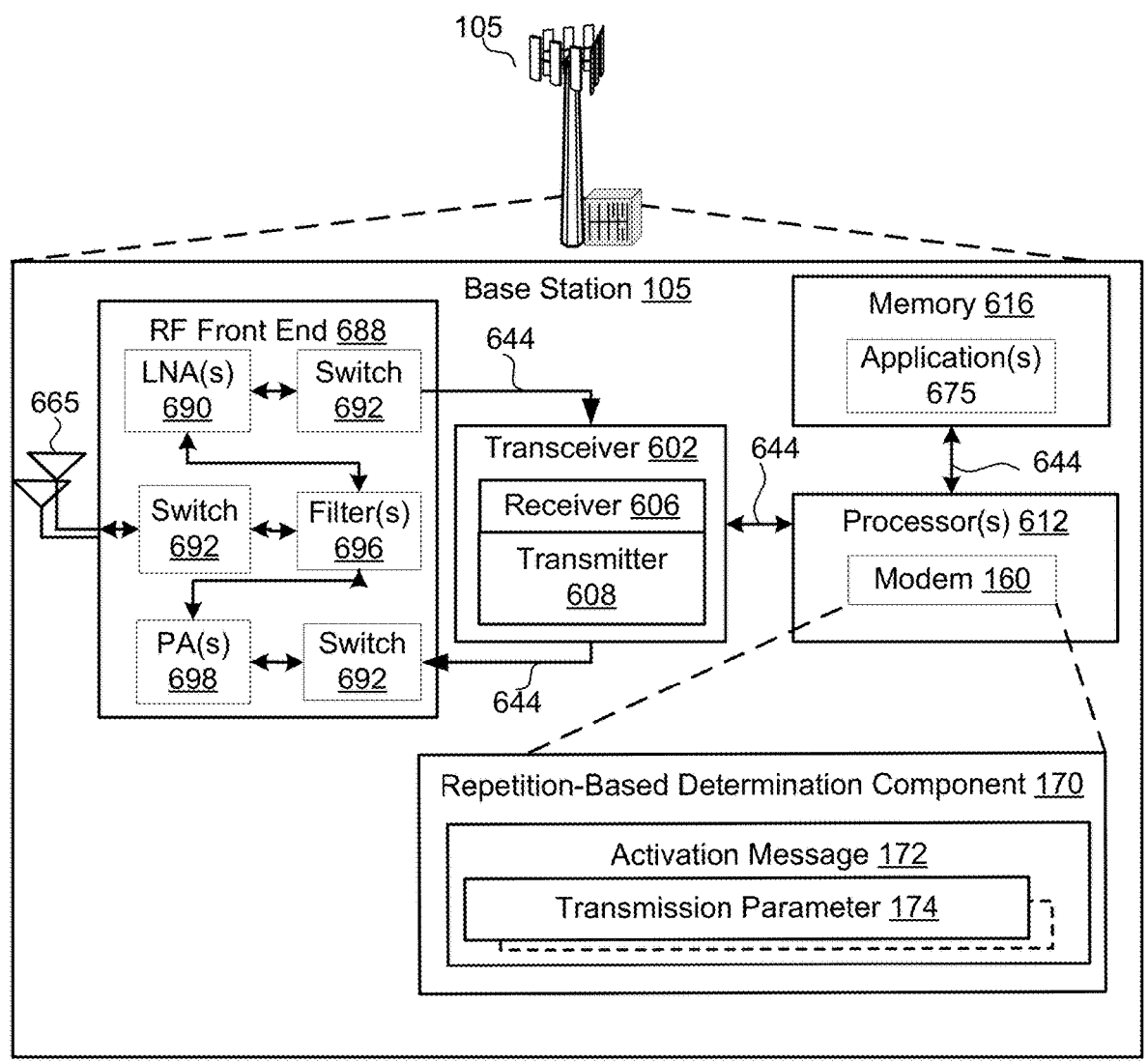
FIG. 6 is a schematic diagram of example components of the base station of FIG. 1.

Referring to FIG. 6, one example of an implementation of base station 105 may include a variety of components, some of which have already been described above, but including components such as one or more processors 612, a memory 616, and a transceiver 602 in communication via one or more buses 644, which may operate in conjunction with modem 160 and repetition-based determination component 170 including activation message 172 to enable one or more of the functions described herein relating to enabling repetition-based uplink communications with a UE in a new radio environment.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
   receiving, by a user equipment (UE), a configuration message indicating a capability for repetition-based uplink communications with a network entity, the configuration message including one or more configuration parameters indicating at least a duration for transmissions on an uplink communication channel and an uplink shortened Transmission Time Interval (sTTI) pattern for the transmissions on the uplink communication channel, wherein the configuration message is included within either a Radio Resource Control (RRC) message or a Medium Access Control (MAC) Control Element (CE);

receiving, by the UE, an activation message for the repetition-based uplink communications from the network entity, the activation message including one or more transmission parameters indicating at least the duration for the transmissions on the uplink communication channel and the sTTI pattern for the transmissions on the uplink communication channel, wherein the repetition-based uplink communications correspond to multiple transmissions of a data packet on the uplink communication channel corresponding to the uplink sTTI pattern, and wherein the activation message is included within either a Medium Access Control (MAC) Control Element (CE) or a Downlink Control Information (DCI) message; and performing, by the UE, repetitive transmissions on the uplink communication channel for the duration indicated by the one or more transmission parameters in the activation message, the repetitive transmissions being configured based on the uplink sTTI pattern.

2. The method of claim 1, wherein the activation message is included within a grant message, and wherein the activation message includes an indication for a number of repetitive transmissions to perform.

3. The method of claim 2, wherein the grant corresponds to a grant for a shortened Physical Uplink Shared Channel (sPUSCH).

4. The method of claim 1, wherein performing the repetitive transmissions further comprises performing the repetitive transmissions on a plurality of uplink sTTIs located in two or more subframes.

5. The method of claim 4, wherein performing the repetitive transmissions on the plurality of uplink sTTIs located in the two or more subframes further comprises maintaining a phase continuity parameter across one or more subframes for the duration indicated by the one or more transmission parameters in the activation message.

6. The method of claim 4, wherein performing the repetitive transmissions on the plurality of uplink sTTIs located in the two or more subframes further comprises transmitting a Demodulation Reference Signal (DMRS) within each of one or more subframes for the duration indicated by the one or more transmission parameters in the activation message.

7. The method of claim 1, wherein performing the repetitive transmissions further comprises transmitting a Sounding Reference Signal (SRS) over a last symbol of a subframe.

8. The method of claim 1, wherein the uplink sTTI pattern for the transmissions on the uplink communication channel corresponds to a fixed uplink sTTI pattern configured for each starting sTTI and the duration for transmissions on the uplink communication channel.

9. An apparatus for wireless communications, comprising:
a memory; and
a processor in communication with the memory, wherein the processor is configured to:
receive, by a user equipment (UE), a configuration message indicating a capability for repetition-based uplink communications with a network entity, the configuration message including one or more configuration parameters indicating at least a duration for transmissions on an uplink communication channel and an uplink shortened Transmission Time Interval (sTTI) pattern for the transmissions on the uplink communication channel, wherein the configuration message is included within either a Radio Resource Control (RRC) message or a Medium Access Control (MAC) Control Element (CE);

receive an activation message for the repetition-based uplink communications from the network entity, the activation message including one or more transmission parameters indicating at least the duration for the transmissions on the uplink communication channel and the sTTI pattern for the transmissions on the uplink communication channel, wherein the repetition-based uplink communications correspond to multiple transmissions of a data packet on the uplink communication channel corresponding to the uplink sTTI pattern, and wherein the activation message is included within either a Medium Access Control (MAC) Control Element (CE) or a Downlink Control Information (DCI) message; and perform, by the UE, repetitive transmissions on the uplink communication channel for the duration indicated by the one or more transmission parameters in the activation message, the repetitive transmissions being configured based on the uplink sTTI pattern.

10. The apparatus of claim 9, wherein the activation message is included within a grant message, and wherein the activation message includes an indication for a number of repetitive transmissions to perform.

11. The apparatus of claim 10, wherein the grant corresponds to a grant for a shortened Physical Uplink Shared Channel (sPUSCH).

12. The apparatus of claim 9, wherein the processor configured to perform the repetitive transmissions is further configured to perform the repetitive transmissions on a plurality of uplink sTTIs located in two or more subframes.

13. The apparatus of claim 12, wherein the processor configured to perform the repetitive transmissions on the plurality of uplink sTTIs located in the two or more subframes is further configured to maintain a phase continuity parameter across one or more subframes for the duration indicated by the one or more transmission parameters in the activation message.

14. The apparatus of claim 12, wherein the processor configured to perform the repetitive transmissions on the plurality of uplink sTTIs located in the two or more subframes is further configured to transmit a Demodulation Reference Signal (DMRS) within each of one or more subframes for the duration indicated by the one or more transmission parameters in the activation message.

15. The apparatus of claim 9, wherein the processor configured to perform the repetitive transmissions is further configured to transmit a Sounding Reference Signal (SRS) over a last symbol of a subframe.

16. The apparatus of claim 9, wherein the uplink sTTI pattern for the transmissions on the uplink communication channel corresponds to a fixed uplink sTTI pattern configured for each starting sTTI and the duration for transmissions on the uplink communication channel.

17. An apparatus for wireless communications, comprising:
means for receiving, by a user equipment (UE), a configuration message indicating a capability for repetition-based uplink communications with a network entity, the configuration message including one or more configuration parameters indicating at least a duration for transmissions on an uplink communication channel and an uplink shortened Transmission Time Interval (sTTI) pattern for the transmissions on the uplink communication channel, wherein the configuration message is included within either a Radio Resource Control (RRC) message or a Medium Access Control (MAC) Control Element (CE);

means for receiving, by the UE, an activation message for repetition-based uplink communications from the network entity, the activation message including one or more transmission parameters indicating at least the duration for the transmissions on the uplink communication channel and the sTTI pattern for the transmissions on the uplink communication channel, wherein the repetition-based uplink communications correspond to multiple transmissions of a data packet on the uplink communication channel corresponding to the uplink sTTI pattern, and wherein the activation message is included within either a Medium Access Control (MAC) Control Element (CE) or a Downlink Control Information (DCI) message; and means for performing, by the UE, repetitive transmissions on the uplink communication channel for the duration indicated by the one or more transmission parameters in the activation message, the repetitive transmissions being configured based on the uplink sTTI pattern.

18. A non-transitory computer-readable medium storing computer code executable by a processor for wireless communications, comprising:

code for receiving, by a user equipment (UE), a configuration message indicating a capability for repetition-based uplink communications with a network entity, the configuration message including one or more configuration parameters indicating at least a duration for transmissions on an uplink communication channel and an uplink shortened Transmission Time Interval (sTTI) pattern for the transmissions on the uplink communication channel, wherein the configuration message is included within either a Radio Resource Control (RRC) message or a Medium Access Control (MAC) Control Element (CE);

code for receiving, by the UE, an activation message for repetition-based uplink communications from the network entity, the activation message including one or more transmission parameters indicating at least the duration for transmissions on an uplink communication channel and the sTTI pattern for the transmissions on the uplink communication channel, wherein the repetition-based uplink communications correspond to multiple transmissions of a data packet on the uplink communication channel corresponding to the uplink sTTI pattern, and wherein the activation message is included within either a Medium Access Control (MAC) Control Element (CE) or a Downlink Control Information (DCI) message; and code for performing, by the UE, repetitive transmissions on the uplink communication channel for the duration indicated by the one or more transmission parameters in the activation message, the repetitive transmissions being configured based on the uplink sTTI pattern.

* * * * *